United States Patent [19]

Higa et al.

[11] Patent Number: 4,795,914
[45] Date of Patent: Jan. 3, 1989

[54] POWER SUPPLY CIRCUIT WITH BACKUP FUNCTION

[75] Inventors: Osamu Higa; Syunichi Hirose, both of Tokyo, Japan

[73] Assignee: Kabushiki Kaisha Toshiba, Kawasaki, Japan

[21] Appl. No.: 134,693

[22] Filed: Dec. 18, 1987

[30] Foreign Application Priority Data

Dec. 26, 1986 [JP] Japan ................... 61-308635

[51] Int. Cl.$^4$ ............................... H02J 7/00
[52] U.S. Cl. .......................... 307/64; 307/72; 307/85
[58] Field of Search .............. 307/64, 66, 72, 85

[56] References Cited

U.S. PATENT DOCUMENTS

| | | | |
|---|---|---|---|
| 3,262,018 | 7/1966 | Bogaerts et al. | 307/64 |
| 3,609,386 | 9/1971 | Patlach | 307/66 |
| 3,784,841 | 1/1974 | Hosaka | 307/64 |
| 4,658,151 | 4/1987 | Wyser et al. | 307/66 |
| 4,670,661 | 6/1987 | Ishikawa | 307/66 |

OTHER PUBLICATIONS

"Practical Electronic Circuit Handbook", Edited by Transistor Technique Staff, CQ Publication Co., Ltd. (literal translation); Issued on Oct. 20, 1975, p. 135.

Primary Examiner—William M. Shoop, Jr.
Assistant Examiner—Sharon D. Logan
Attorney, Agent, or Firm—Oblon, Fisher, Spivak, McClelland & Maier

[57] ABSTRACT

A power supply circuit includes a series circuit, made up of a current feeding element and a charge storage element, which is coupled in parallel to the output of a power supply source. The power supply circuit also includes a first diode, connected to one terminal of the current feeding element, for feeding a first current from the power supply source to a load, and a second diode, connected to the other terminal of the current feeding element, for feeding a second current from the charge storage element to the load. The charge storage element can be fully charged-up with the voltage coming directly from the power supply source.

20 Claims, 3 Drawing Sheets

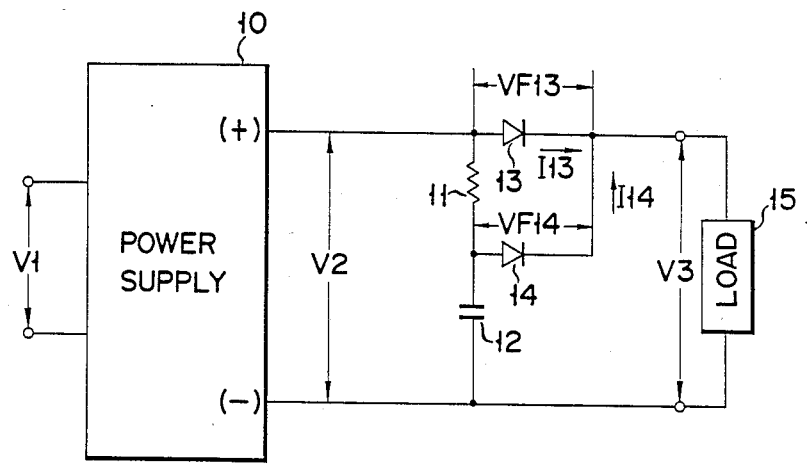
F I G. 1
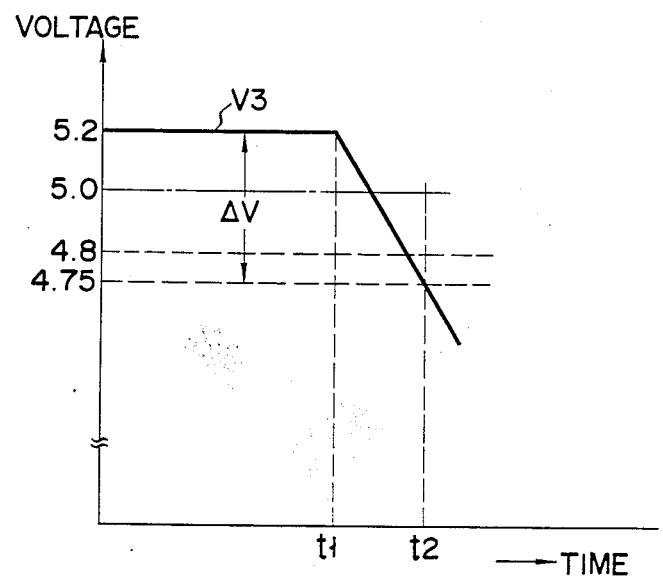
F I G. 2

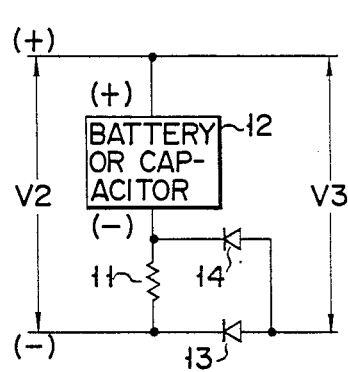
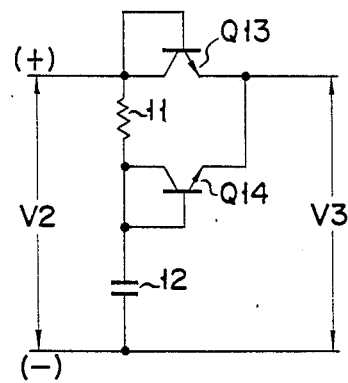
F I G. 5     F I G. 6
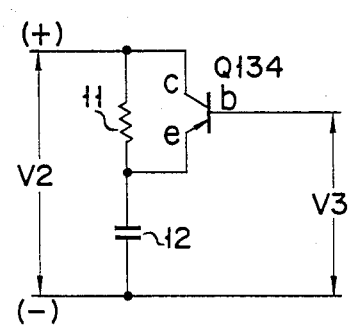
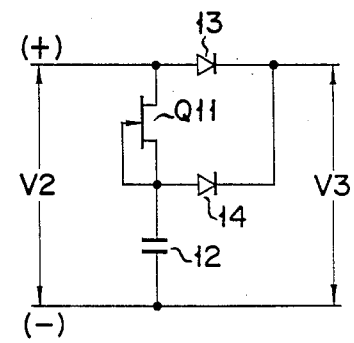
F I G. 7     F I G. 8
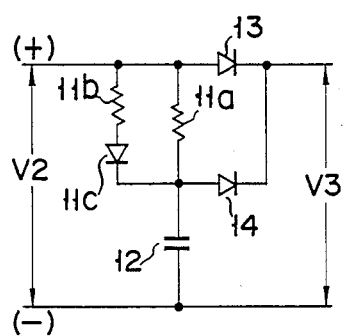
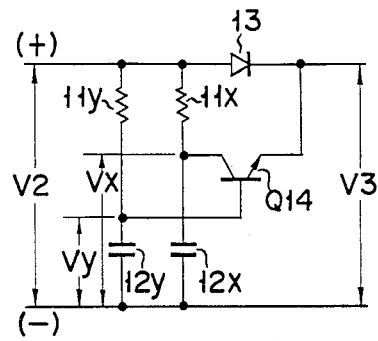
F I G. 9     F I G. 10

POWER SUPPLY CIRCUIT WITH BACKUP FUNCTION

BACKGROUND OF THE INVENTION

The present invention relates to the improvement of a power supply circuit having a temporary backup function.

In general, a semiconductor integrated circuit such as a TTL control logic circuit requires a continuous supply of low voltage power (e.g., 5 V). To protect the integrated circuit against damage resulting from a sudden loss of power supply, the main power supply source normally includes a large capacitance capacitor or a rechargeable battery serving as a backup power source.

FIG. 3 shows a schematic circuit diagram of a prior art power supply circuit having a backup function.

Power supply 10 includes an electronic voltage regulator. Unregulated DC input voltage V1 of power supply 10 is obtained from a conventional AC rectifier circuit (not shown). Power supply 10 outputs regulated voltage V2. A load such as a RAM and/or TTL logic board (not shown) is coupled to the output circuit of power supply 10, via forwardly-biased diode 13. Power supply voltage V3 is applied to the load. (V3=V2−VF13; VF13 is a forward voltage drop of diode 13).

Resistor 11 and capacitor 12 together constitute a series circuit which is parallel coupled to the voltage V3 circuit. Diode 14 is parallel connected to resistor 11 such that it is reversed biased by voltage V3 when power supply 10 is in operation. The resistance of resistor 11 can be, for example, anywhere from several ohms to several tens of ohms. Diode 13 prevents discharging from capacitor 12 to power supply 10. Diode 14 equivalently reduces the parallel resistance of resistor 11 and diode 14 when power supply 10 is shut down and when the load is supplied with current from capacitor 12.

Assume that diodes 13 and 14 are Schottky barrier diodes each of whose respective forward voltage drops VF13 and VF14 is 0.4 V, that an allowable range of load voltage V3 is 5 V±5% (4.75 V to 5.25 V), and that a nominal value of voltage V3 is 5.2 V. Based on this assumption, regulated voltage V2 from power supply 10 is to be 5.6 V (=5.2 V+0.4 V of diode 13).

FIG. 4 shows an output voltage characteristic of the circuit of FIG. 3. When a fault develops in power supply 10 and voltage V2 comes down zero (time t1), load voltage V3 is correspondingly reduced from 5.2 V (charged-up voltage of capacitor 12) to 4.8 V (=5.2 V−0.4 V of diode 14). Whereupon, capacitor 12 is discharged by the load, chiefly via diode 14. With this discharging, load voltage V3 is gradually reduced from 4.8 V to the underlimit load voltage of 4.75 V (from time t1 to time t2 in FIG. 4).

Assume that the capacitance of capacitor 12 is C, the load current is I, the allowable variation range of voltage V3 is ΔV, and the voltage compensation period for ensuring V3≧4.75 V is T. Then, the following equation can be obtained:

$$C = (I \times T)/\Delta V \quad (1)$$

When equation (1) is applied to the above assumption, we obtain $$C = (I \times T)/(0.05) = 20(I \times T) \quad (2)$$

The coefficient "20" in equation (2) indicates that a large capacitance is required for capacitor 12. (Conventionally, T is 0.1 second or more.) This is a disadvantage of the prior art as is shown in FIG. 3.

SUMMARY OF THE INVENTION

It is accordingly an object of this invention to provide an improved power supply circuit having a temporary backup function, which does not require a relatively large-capacity energy storage element.

To achieve the above object, the power supply circuit of this invention includes a series circuit, comprising a current feeding element and a charge storage element, which is coupled in parallel to the output of a power supply source; a first unidirectional current conductor, connected to one terminal of the current feeding element, for feeding a first current from the power supply source to a load; a second unidirectional current conductor, connected to the other terminal of the current feeding element, for feeding a second current from the charge storage element to the load.

According to the power supply circuit having the above configuration, the charge storage element can be fully charged-up with the voltage coming directly from the power supply, unlike in the case of FIG. 3 wherein the capacitor is charged-up with a relatively low voltage which is less than the power supply voltage by the forward voltage drop of the diode. This means that allowable voltage variation range ΔV of equation (1) according to the present invention can be made larger than that of FIG. 3, to thereby reduce the necessary capacitance for the capacitor or charge storage element.

BRIEF DESCRIPTION OF THE DRAWINGS

FIG. 1 shows a basic configuration of a power supply circuit according to the present invention;

FIG. 2 shows an output voltage characteristic of the power supply circuit of FIG. 1;

FIG. 5 shows a first modification of part of the power supply circuit in FIG. 1;

FIG. 6 shows a second modification of part of the power supply circuit in FIG. 1;

FIG. 7 shows a third modification of part of the power supply circuit in FIG. 1;

FIG. 8 shows a fourth modification of part of the power supply circuit in FIG. 1;

FIG. 9 shows a fifth modification of part of the power supply circuit in FIG. 1;

FIG. 10 shows a sixth modification of part of the power supply circuit in FIG. 1.

DETAILED DESCRIPTION OF THE PREFERRED EMBODIMENTS

In the following, preferred embodiments of the present invention will be described in detail, with reference to the accompanying drawings. In the description, the same or functionally equivalent elements are denoted by the same or similar reference symbols throughout the drawings, for the purposes of simplicity.

Figure 3:
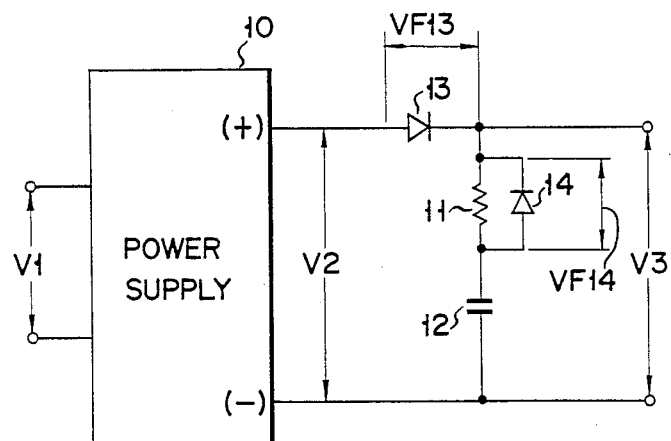
FIG. 3 shows a basic configuration of a conventional power supply circuit.
Figure 4:
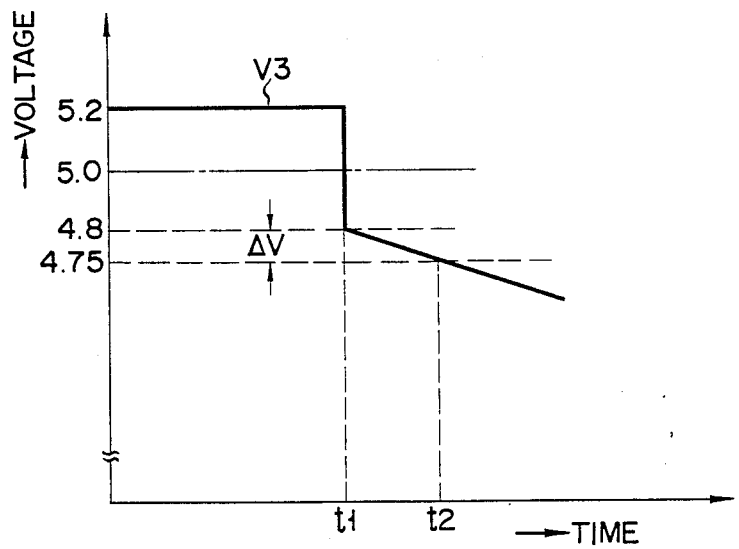
FIG. 4 shows an output voltage characteristic of the power supply circuit of FIG. 3.

The configuration of FIG. 1 differs from that of FIG. 3, in regard to the way in which Schottky barrier diodes 13 and 14 are connected to resistor 11. In FIG. 3, the series circuit constituted by resistor 11 and capacitor 12 is connected to the cathode side of diode 13, so that capacitor 12 can be charged-up to V2-VF13 at most. In contrast, in FIG. 1, this same series circuit is connected to the anode side of diode 13, so that capacitor 12 can be fully charged-up to V2.

FIG. 2 shows an output voltage characteristic of the power supply circuit of FIG. 1. When power supply 10 is operating normally (before time t1), load 15 is supplied with voltage V3 by current I13 from diode 13.

If a fault develops in power supply 10 and voltage V2 drops to zero (time t1), no current flows through diode 13—instead, backup current I14 flows from capacitor 12 (charged-up to 5.6 V) to load 15, via diode 14. At this time, although part of the charge in capacitor 12 discharges to power supply 10 through resistor 11, this current can be made far smaller than backup current I14 by a proper selection of the resistance of resistor 11. For instance, when nominal load current I13 is 60A and the resistance of resistor 11 is 10Ω, then the above discharge current is 0.56 A (=5.6 V/10Ω) at most, and 0.56 A is far smaller than 60 A.

The initial value of load voltage V3 obtained by the charges in capacitor 12 is 5.2 V. In this case, as will be seen from the illustration of the FIG. 2, ΔV of equation is 0.45 V (=5.2 V−4.75 V). When ΔV=0.45 V is applied to a quotient, we obtain $$C = (I \times T)/(0.45) \approx 2.2 \ (I \times T) \quad (3)$$

The coefficient "2.2" in the equation indicates that the capacitance required for capacitor 12 of FIG. 1 is far smaller than that required for capacitor 12 of FIG. 3. (Compare equation (3) with equation (2)).

More specifically, according to the embodiment of FIG. 1, the capacitance (C) necessary for capacitor 12 can be 1/9 of that of the prior art configuration of FIG. 3, provided that the rated load voltage (V3), rated load current (I13, I14), and required voltage compensation period (t1~t2) are fixed. This is an advantage of the present invention over the prior art.

FIG. 5 shows a first modification of part of the power supply circuit in FIG. 1. In FIG. 5, diodes 13 and 14 are inserted in the negative potential circuit of a power supply. Also capacitor 12 can be replaced with a rechargeable battery.

FIG. 6 shows a second modification of part of the power supply circuit in FIG. 1. In FIG. 6, diodes 13 and 14 are replaced with diode-connected bipolar transistors Q13 and Q14. The collector-emitter (or base-emitter) forward voltage drop of a diode-connected bipolar transistor (e.g., Si type) can be smaller than the anode-cathode forward voltage drop of a diode (e.g., Si type).

FIG. 7 shows a third modification of part of the power supply circuit in FIG. 1. In FIG. 7, diodes 13 and 14 are replaced with the collector-base and emitter-base P-N junctions of bipolar transistor Q134.

FIG. 8 shows a fourth modification of part of the power supply circuit in FIG. 1. In FIG. 8, resistor 11 is replaced with gate-source-connected depletion type power FET Q11 which serves as a current source for charging backup capacitor 12. Any other conventional current source circuit can be used for FET Q11.

FIG. 9 shows a fifth modification of part of the power supply circuit in FIG. 1. In FIG. 9, resistor 11 (e.g., 10Ω) is replaced with relatively large resistor 11a (e.g., 100Ω), but a series circuit of small resistor 11b (e.g., 1Ω) and diode 11c is parallel connected to resistor 11a.

When the power supply (not shown) normally operates, capacitor 12 is quickly charged through the small resistance of resistor 11b and forwardly-biased diode 11c. When the voltage difference between power supply voltage V2 and the charged voltage of capacitor 12 becomes less than the threshold voltage of diode 11c (e.g., 0.6 V for a Si diode), then capacitor 12 is slowly charged up to voltage V2 through the large resistance of resistor 11a. When the power supply faults, the discharge current from capacitor 12 to the power supply side is restricted by the large resistance of resistor 11a.

FIG. 10 shows a sixth modification of part of the power supply circuit in FIG. 1. In FIG. 10, the series circuit of resistor 11 and capacitor 12 is replaced with a first series circuit of resistor 11x and capacitor 12x, and diode 14 is replaced with bipolar transistor Q14. A second series circuit of resistor 11y and capacitor 12y is parallel connected to the first series circuit of resistor 11x and capacitor 12x. The collector of transistor Q14 is connected to the junction between resistor 11x and capacitor 12x, and the base thereof is connected to the junction between resistor 11y and capacitor 12y. The emitter of transistor Q14 is connected to the cathode of diode 13.

Figure 11:
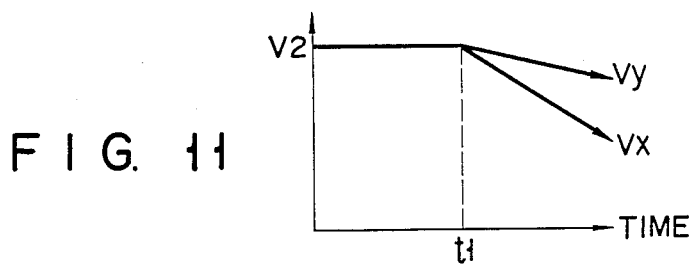
FIG. 11 is a graph showing voltage characteristics of the circuit of FIG. 10.

FIG. 11 is a graph showing voltage characteristics of the circuit of FIG. 10. According to the circuit of FIG. 10, the base current of transistor Q14 is far smaller than the collector current thereof. (When current amplification factor hFE of Q14 is 100, the base current is 1/100 of the collector current.) For this reason, even if the capacitance of capacitor 12y is far smaller than that of capacitor 12x (e.g., 1/10 of capacitor 12X), the dropping rate of voltage Vy of capacitor 12y is more moderate than that of voltage of capacitor 12x, as shown in FIG. 11.

So long as voltage Vy is higher than voltage Vx by the base-emitter threshold voltage of transistor Q14, transistor Q14 can be fully turned on so that the potential difference between voltages Vx and V3 becomes only collector-emitter saturation voltage Vce(sat) of transistor Q14.

Incidentally, a battery, DC generator, or any other DC power source can be used for providing voltage V1 or V2.

While the invention has been described in connection with what is presently considered to be the most practical and preferred embodiment, it is to be understood that the invention is not limited to the disclosed embodiment but, on the contrary, is intended to cover various modifications and equivalent arrangements included within the scope of the appended claims, which scope is to be accorded the broadest interpretation so as to encompass all such modifications and equivalent arrangements.

What is claimed is:

1. A power supply circuit having a backup function, comprising:
    charge storage means for storing charges obtained from a power supply source;
    current feeding means, having two terminals, one of which is coupled to the power supply source and the other of which is coupled to said charge storage means, for feeding the charges from said power supply source to said charge storage means, said current feeding means includes a first resistor, one end of which is connected to the one terminal of said current feeding means, and the other end of which is connected to the other terminal thereof, said current feeding means further includes a series circuit made up of a second resistor and a current blocking diode, coupled in parallel to said first resistor;

first current conductor means, coupled to the one terminal of said current feeding means, for unidirectionally feeding a first current from the power supply source to a load; and second current conductor means, coupled to the other terminal of said current feeding means, for unidirectionally feeding a second current from said charge storage means to the load.

2. A power supply circuit according to claim 1, wherein:

a resistance of said second resistor is lower than that of said first resistor, and said current blocking diode is so connected to said storage means that said current blocking diode is reverse biased by a voltage potential delivered from said charge storage means when a voltage of the power supply is less than that of said charge storage means.

3. A power supply circuit according to claim 1, wherein:

said current feeding means includes a resistor.

4. A power supply circuit according to claim 1, wherein:

said current feeding means includes a current source.

5. A power supply circuit according to claim 1, wherein said first current conductor means includes a diode.

6. A power supply circuit according to claim 1, wherein said first current conductor means includes a bipolar transistor.

7. A power supply circuit according to claim 1, wherein said second current conductor means includes a diode.

8. A power supply circuit according to claim 1, wherein said second current conductor means includes a bipolar transistor.

9. A power supply circuit according to claim 1, wherein said first and second current conductor means include P-N junctions of a bipolar transistor.

10. A power supply circuit having a backup function, comprising:

charge storage means for storing charges obtained from a power supply source;

current feeding means, having two terminals one of which is coupled to the power supply source and the other of which is coupled to said charge storage means, for feeding the charges from said power supply source to said charge storage means, said current feeding means includes a first resistor one end of which is connected to the one terminal of said current feeding means, and the other end of which is connected to the other terminal thereof, said current feeding means further includes a series circuit made up of a second resistor and a current blocking diode, coupled in parallel to said first resistor, wherein a resistance of said second resistor is lower than that of said first resistor, and said current blocking diode is so connected to said charge storage means that said current blocking diode is reverse biased by a voltage potential delivered from said chrage storage means when a voltage of the power supply is less than that of said charge storage means;

first current conductor means, coupled to the one terminal of said current feeding means, for unidirectionally feeding a first current from the power supply source to a load; and second current conductor means, coupled to the other terminal of said current feeding means, for unidirectionally feeding a second current from said charge storage means to the load.

11. A power supply circuit having a backup function, comprising:

charge storage means for storing charges obtained from a power supply source;

current feeding means, having two terminals one of which is coupled to the power supply source and the other of which is coupled to said charge storage means, for feeding the charges from said power supply source to said charge storage means;

first current conductor means, coupled to the one terminal of said current feeding means, for unidirectionally feeding a first current from the power supply source to a load; and second current conductor means, coupled to the ther terminal of said current feeding means, for unidirectionally feeding a second current from said charge storage means to the load;

wherein said charge storage means includes:

first capacitor means for storing first charges received from said power supply source; and second capacitor means for storing second charges received from said power supply source, wherein said current feeding means includes:

first resistor means, having two terminals one of which is coupled to said power supply source and the other of which is coupled to said first capacitor means, for feeding the first charges from said power supply source to said first capacitor means; and second resistor means, having two terminals one of which is coupled to said power supply source and the other of which is coupled to said second capacitor means, for feeding the second charges from said power supply source to said second capacitor means, and wherein said second current conductor means includes a bipolar transistor, the collector of which is coupled to a junction between said first resistor means and said first capacitor means, the base of which is coupled to a junction between said second resistor means and said second capacitor means, and the emitter of which is coupled to the load.

12. A power supply circuit according to claim 11, wherein:

said first capacitor means includes a first capacitor and said second capacitor means includes a second capacitor, the capacitance of which is lower than that of said first capacitor.

13. A power supply circuit according to claim 11, wherein:

said current feeding means includes a resistor.

14. A power supply circuit according to claim 11, wherein:

said current feeding means includes a current source.

15. A power supply circuit according to claim 11, wherein:

said first current conductor means includes a diode.

16. A power supply circuit according to claim 11, wherein:

said first current conductor means includes a bipolar transistor.

17. A power supply circuit according to claim 11, wherein:
said second current conductor means includes a diode, 18. A power supply circuit according to claim 11, wherein:
said second current conductor means includes a bipolar transistor.

19. A power supply circuit according to claim 11, wherein:
said first and second current conductor means include P-N junctions of a bipolar transistor.

20. A power supply circuit having a backup function, comprising:
charge storage means for storing charges obtained from a power supply source;
current feeding means, having two terminals, one of which is coupled to the power supply source and the other of which is coupled to said charge storage means, for feeding the charges from said power supply source to said charge storage means;
first current conductor means, coupled to the one terminal of said current feeding means, for unidirectionally feeding a first current from the power supply source to a load; and
second current conductor means, coupled to the other terminal of said current feeding means, for unidirectionally feeding a second current from said charge storage means to the load;
wherein said charge storage means includes:
first capacitor means for storing first charges received from said power supply source; and
second capacitor means for storing second charges received from said power supply source,
wherein said current feeding means includes;
first resistor means, having two terminals one of which is coupled to said first capacitor means, for feeding the first charges from said power supply source to said first capacitor means; and
second resistor means, having two terminals one of which is coupled to said power supply source and the other of which is coupled to said second capacitor means, for feeding the second charges from said power supply source to said second capacitor means,
and wherein said second current conductor means includes a bipolar transistor the collector of which is coupled to a junction between said first resistor means and said first capacitor means, the base of which is coupled to a junction between said second resistor means and said second capacitor means, and the emitter of which is coupled to the load, and
wherein said first capacitor means includes a first capacitor and said second capacitor means includes a second capacitor, the capacitance of which is lower than that of said first capacitor.

* * * * *